United States Patent [19]

Bibi

[11] Patent Number: 4,909,931
[45] Date of Patent: Mar. 20, 1990

[54] WATER-PURIFIER DEVICE

[75] Inventor: Eitan Bibi, D.N. Haela, Israel

[73] Assignee: Tana - Netiv Halamed-He Industries, Haela, Israel

[21] Appl. No.: 134,382

[22] Filed: Dec. 17, 1987

[51] Int. Cl.⁴ .......................... B01D 36/00; C02F 1/32
[52] U.S. Cl. ...................................... 210/85; 210/192; 210/259; 210/262; 250/438; 422/24
[58] Field of Search ............... 210/143, 259, 253, 260, 210/262, 266, 282, 295, 335, 97, 416.1, 416.3, 85, 192, 243; 250/432 R, 433, 435, 436, 437, 438, 526; 422/24

[56] References Cited

U.S. PATENT DOCUMENTS

| | | | |
|---|---|---|---|
| 4,217,219 | 9/1980 | Mullerheim et al. | 210/416.1 |
| 4,528,093 | 7/1985 | Winer | 210/416.3 |
| 4,615,799 | 10/1986 | Mortensen | 250/438 |
| 4,694,179 | 9/1987 | Lew et al. | 250/436 |
| 4,755,292 | 7/1988 | Merriam | 250/432 R |
| 4,759,844 | 7/1988 | Lipschultz et al. | 210/259 |
| 4,769,131 | 9/1988 | Noll et al. | 250/438 |
| 4,849,100 | 7/1989 | Papandrea | 210/266 |

*Primary Examiner*—Richard V. Fisher
*Assistant Examiner*—Joseph Drodge
*Attorney, Agent, or Firm*—Benjamin J. Barish

[57] ABSTRACT

A water-purifier device, comprises a housing to be mounted vertically, a water inlet, a water outlet, and two tubes extending generally horizontally of the housing when the housing is mounted vertically. The first tube defines a first water flow passageway including a filter for removing solid particles and a quantity of activated carbon for removing undesirable odors and tastes from the water flowing through the first flow passageway. The second tube defines a second water flow passageway connected between the first tube and the housing outlet, and including an ultraviolet lamp subjecting the water flowing therethrough to ultraviolet radiation.

5 Claims, 4 Drawing Sheets

FIG 2a
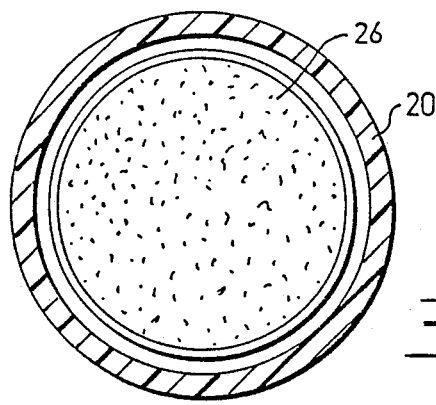
FIG 2b
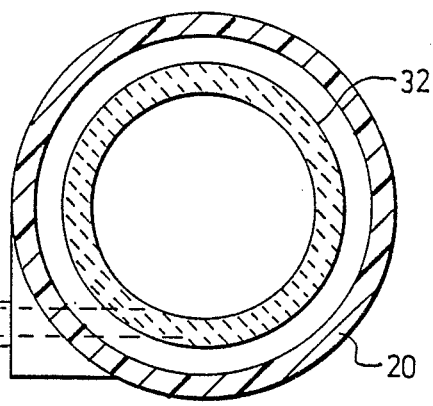
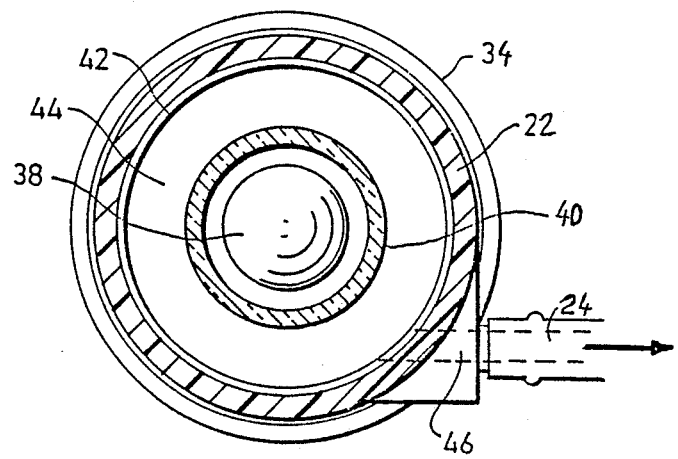
FIG 2c

WATER-PURIFIER DEVICE

BACKGROUND OF THE INVENTION

The present invention relates to water-purifier devices such as are used for providing high-quality drinking water for home or other use.

Water-purifier devices are known comprising a housing having an ultraviolet lamp disposed within a tube and radially spaced from its inner surface to provide an annular passageway for the water to flow while being subjected to the ultraviolet radiation in order to sterilize the water. In one known type, the ultraviolet lamp is enclosed by a sleeve, such as of quartz, which is transparent to the ultraviolet radiation. It has been found, however, that the efficiency of the ultraviolet lamp to sterilize the water is decreased by solid particles within the water which tend to deposit on the outer face of the ultraviolet lamp sleeve. Such deposits of solid particles on the ultraviolet sleeve also increase the down-time during which the device is not in service because of the need to dismantle and clean it.

An object of the present invention is to provide a water-purifier device having advantages in the foregoing respects.

BRIEF SUMMARY OF THE INVENTION

According to the present invention, there is provided a water-purifier device comprising a housing including means for mounting the housing vertically, a water inlet, a water outlet, a first tube within the housing, and a second tube within the housing. The first tube is connected at one end to the water inlet and extends within the housing, at an upward inclination from the mentioned one end when the housing is mounted vertically. The first tube defines a first water flow passageway including a filter for removing solid particles and a quantity of activated carbon for removing undesirable odours and tastes from the water flowing through the first flow passageway. The second tube is connected at its opposite ends between the first tube and the water outlet and also extends within the housing, over the first tube at an upward inclination from its end connected to the first tube when the housing is mounted vertically. The second tube defines a second water flow passageway connected between the first tube and the housing outlet, and includes an ultraviolet lamp subjecting the water flowing therethrough to ultraviolet radiation.

The water-purifier device constructed in accordance with the foregoing features thus removes solid particles from the water before the water is subjected to the sterilizing radiation of the ultraviolet lamp, thereby increasing the efficiency of the lamp to sterilize the water. Moreover, undesirable odours and tastes are also removed by the same unit which removes the solid particles, thereby better purifying the outletted water and producing a higher-quality water for drinking purposes.

As set forth above, the first tube is located in the housing generally horizontally but with an upward inclination from the one end connected to the housing inlet to its opposite end connected to the second tube; the second tube is also located in the housing so as to have an upward inclination from its end connected to the first tube to its opposite end connected to the housing outlet. Such an arrangement increases the efficiency of the ultraviolet lamp to sterilize the water, as it prevents the formation of air bubbles in the second tube which would absorb some of the ultraviolet radiation before reaching the water passing through that tube.

The efficiency of the ultraviolet lamp is further increased by providing an annular reflector surrounding the ultraviolet lamp and defining therewith an annular space, constituting the second water flow passageway; and by providing a tangential inlet to the second tube to produce a cyclonic flow through the second flow passageway.

According to a further feature in the described preferred embodiment, the water-purifier device also includes a solenoid-actuated valve at the housing inlet, the valve thus being upstream of the second tube containing the ultraviolet lamp, and an electrical circuit for energizing the ultraviolet lamp, and also for energizing the solenoid valve to open it to the flow of water to the first tube, which electrical circuit includes means for closing the solenoid-actuated valve automatically in response to the deenergization of the ultraviolet lamp. Thus, should the ultraviolet lamp become deenergized for any reason, e.g., because of burning-out the lamp or a component of its energization circuit, the inlet valve to the device will be automatically closed, thereby assuring that any water flowing out of the device will have been properly subjected to the ultraviolet radiation.

Further features and advantages of the invention will be apparent from the description below.

BRIEF DESCRIPTION OF THE DRAWINGS

The invention is herein described, by way of example only, with reference to the accompanying drawings, wherein:

FIGS. 2a, 2b and 2c are sectional views along lines a—a, b—b and c—c of FIG. 2, respectively;

DESCRIPTION OF A PREFERRED EMBODIMENT

Figure 1:
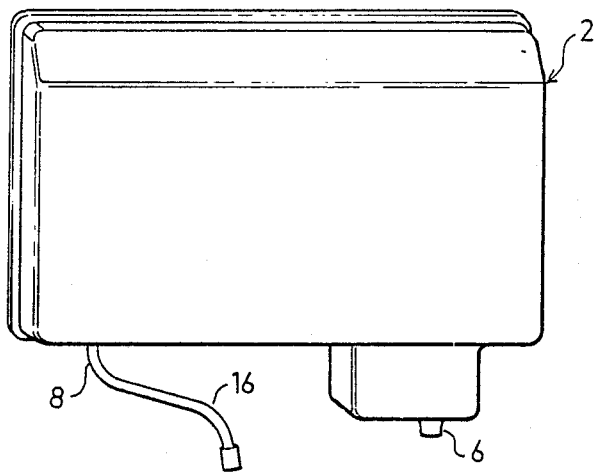
FIG. 1 illustrates one form of water-purifier device constructed in accordance with the present invention.
Figure 4:
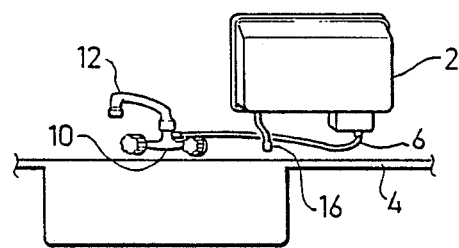
FIG. 4 illustrates one manner of mounting the device of FIG. 1 over the sink.
Figure 5:
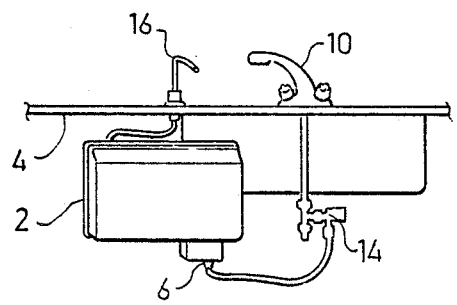
FIG. 5 illustrates another manner of mounting the device of FIG. 1 under the sink.

The water-purifier device illustrated in the drawings is intended primarily for home or office use in order to provide relatively pure, uncontaminated, odourless and tasty water for drinking purposes. It comprises a housing, generally designated 2, adapted to be mounted in a vertical position over the sink 4 as illustrated in FIG. 4, or under the sink 4 as illustrated in FIG. 5. Housing 2 includes an inlet 6 adapted to be connected to the water supply pipe supplying the untreated water, and an outlet 8 for outletting the relatively pure water after treatment by the water-purifier device.

When housing 2 is mounted over the sink 4 as illustrated in FIG. 4, its inlet 6 is preferably connected to the water faucet 10 upstream of the spout 12 as shown in FIG. 4; and when the housing is connected under the sink 4, its inlet 6 is preferably connected to a fitting 14 upstream of the water supply pipe leading to the faucet 10. In either arrangement, the outlet 8 of the water-purifier housing 2 is provided with a nozzle 16 which is pivotable about a vertical axis, to enable the user to conveniently place a glass or other receptacle under the nozzle for receiving the purified water outletted therefrom.

Figure 2:
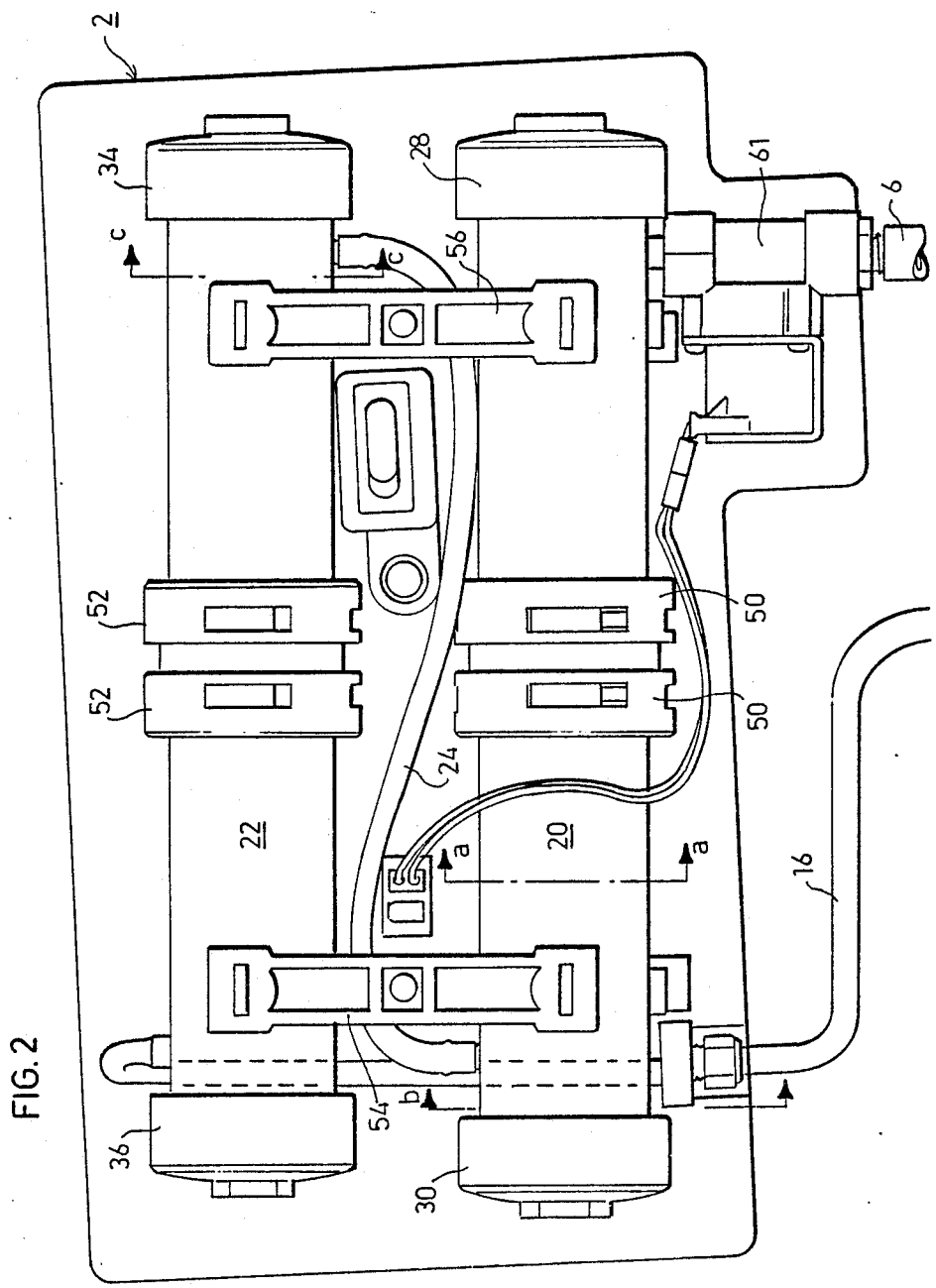
FIG. 2 illustrates the device of FIG. 1 with the outer cover removed in order to show internal structure.

FIG. 2 illustrates the internal structure of the water-purifier within its housing 2, i.e., with the cover removed. Thus, within housing 2 are two tubes 20, 22, extending generally horizontally of the housing when the housing is mounted vertically. Tube 20 defines a first water flow passageway including a filter for removing solid particles and also a quantity of activated carbon for removing undesirable odours and tastes from the water flowing therethrough. Tube 22 defines a second, water flow passageway including an ultraviolet lamp subjecting the water flowing therethrough to ultraviolet sterilizing radiation. One end of tube 20 is connected to the housing inlet 6, whereas tube 22 is connected, via tubelet 24, between the outlet end of tube 20 and the inlet end of tube 22, the opposite end of tube 22 being connected to the housing outlet 8.

It will thus be seen that the water flows from the inlet 6 into the right end of tube 20, through that tube to its left end, via tubelet 24 to the right end of tube 22, through that tube, and then out through the outlet 8 to the outlet nozzle 16.

As shown particularly in FIG. 2, when housing 2 is mounted in the vertical position, tube 20 is located to have an upward inclination from its right end connected to the inlet 6, to its opposite end connected via tubelet 24 to the right end of tube 22. Tube 22 is also located to have an upward inclination from its right end connected to tubelet 24, to its left end connected to the housing outlet 8. This arrangement prevents the formation of air bubble particularly in tube 22 containing the ultraviolet lamp, which air bubbles would tend to absorb the radiation and would therefore significantly decrease the efficiency of the ultraviolet in sterilizing the water flowing through tube 22.

The structure of the filter and deodourizer tube 20, and also of the sterilizer tube 22, is more particularly illustrated in FIGS. 2a, 2b and 2c showing sections of these tubes along lines a—a, b—b and c—c, respectively, of FIG. 2.

Thus, as shown in FIG. 2a, tube 20 is filled for its complete length with a quantity of activated carbon 26 which removes undesirable odours and tastes from the water flowing through that tube. Tube 20 is of cylindrical configuration open at its opposite ends, which ends are closed by removable, threaded caps 28, 30, to permit filling and removal of the activated carbon whenever necessary. Cap 30 at the end of tube 20 opposite to its inlet 6 also serves the function of clamping a porous sleeve 32 (FIG. 2b) for removing solid particles before the water is inletted into the sterilizer tube 22.

The sterilizer tube 22 containing the ultraviolet lamp is also of cylindrical configuration open at both ends, which ends are closed by removable, threaded end caps 34, 36, to provide access into the interior of the tube. As shown in FIG. 2c, the sterilizer tube 22 includes an elongated ultraviolet lamp 38 extending longitudinally through the length of the tube and enclosed within a quartz sleeve 40 which is transparent to the ultraviolet radiations produced by lamp 38. Sterilizer tube 22 further includes an annular reflector 42 coaxial with lamp 38 and sleeve 40 but of larger diameter than the sleeve so as to define an annular space 44 which serves as the water flow passageway for the water flowing through the sterilizer tube. As also shown in FIG. 2c, the inlet 46 to the sterilizer tube 22, connected via tubelet 24 to the outlet end of tube 20, is formed tangentially of tube 22, thereby producing a cyclonic flow of the water through the annular space 44. The inside radius of the tangential inlet 46 is very small to enhance the cyclonic flow. This causes the water to pass through the annular space 44 in the form of a relatively high-velocity, thin layer, which also washes away any deposits tending to accumulate on sleeve 40 or reflector 42, thereby further increasing the efficiency of the ultraviolet lamp 38.

The inlet 46 to the sterilizer tube 22 preferably includes a flow regulator (not shown) to regulate the flow around the ultraviolet lamp 38.

The filtration tube 20 and sterilizer tube 22 may be secured to housing 2 in any suitable manner, such as by straps 50 and 52, and are firmly anchored in placed by clamps 54 and 56.

The inlet 6 to the filtration tube 20 includes a solenoid-actuated valve 61. This valve is normally closed, but is opened when energized by the electrical circuit illustrated in FIG. 3, which circuit also energizes the ultraviolet lamp 38 within the sterilization tube 22. As more particularly described below, the electrical circuit illustrated in FIG. 3 includes means for closing the solenoid-actuated valve 61 automatically in response to the deenergization of the ultraviolet lamp 38 for any reason, e.g., because of failure of the lamp or its energization circuit, which thereby assures that no water will be outletted from the device which has not been subjected to ultraviolet radiation.

Figure 3:
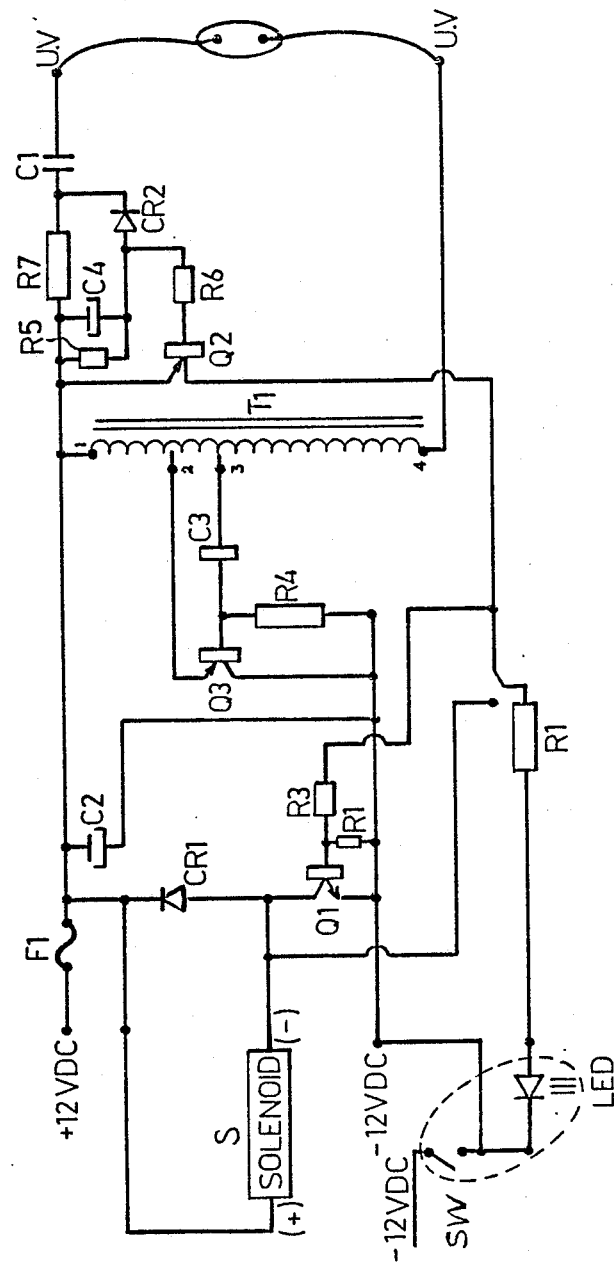
FIG. 3 is a diagram schematically illustrating the electrical circuit in the device of FIG. 1.

The electrical circuit for controlling the energization of the ultraviolet lamp 38, and also of the solenoid S of valve 61, is shown in FIG. 3.

The circuit is supplied by twelve volts DC to an oscillator including transistor $Q_3$ and a power transformer $T_1$, the AC output of the oscillator being converted to DC by rectifier $CR_2$ before applied to the control circuit including the indicator lamp LED and solenoid S for valve 61 to open the valve, which is normally closed, and thereby to permit the water to enter the unit via inlet 6.

If the ultraviolet lamp 38 should burn out, or become non-conducting for any reason, solenoid S is deenergized, automatically closing valve 61, and thereby assuring that the device will automatically be turned-off to the flow of water whenever the ultraviolet lamp is not operating. The flow of current to the ultraviolet lamp 38 is sensed by resistor $R_7$, coupled to the base of transistor $Q_2$, which transistor is connected to the base of transistor $Q_1$ controlling the power to the solenoid S. Transistor $Q_2$ also controls the power to indicator lamp LED, which indicator lamp is energized only when the device, including the ultraviolet lamp 38, is properly operating.

The circuit diagram of FIG. 3 illustrates the following additional circuit elements: On/Off switch SW; current limiter resistor $R_1$ to the indicator lamp LED; interference limiter base resistor $R_2$ for transistor $Q_1$; base current limiter resistor $R_3$ for transistor $Q_1$; base current limiter resistor $R_4$ for transistor $Q_3$; bleeder resistor $R_5$ for capacitor $C_4$; base current limiter resistor $R_6$ for transistor $Q_2$; current limiter capacitor $C_1$ for the ultraviolet lamp 38; input filter capacitor $C_2$; base current limiter capacitor $C_3$ for transistor $Q_3$; current filter capacitor $C_4$ for the ultraviolet lamp 38; diode $CR_1$ for suppressing inductive currents generated by the solenoid S; and current fuse $F_1$ to protect the input circuit.

The operation of the water-purifier device illustrated in the drawings is as follows:

When the device is turned on by switch SW, the ultraviolet lamp 38 is first energized, and then immediately thereafter the normally-closed solenoid-actuated valve 61 is energized to open the valve.

The water from inlet 6 is thus inletted into the right end of the filtration tube 20 and, as it travels through the complete length of the tube, the undesirable odours and tastes in the water are removed by the activated carbon 26 (FIG. 2a) within the tube. Also the solid particles are removed by the porous sleeve 32 (FIG. 2b) at the end of the tube.

The water then flows from the left end of the filtration tube 20 via tubelet 24 into the right end of the sterilization tube 22, and enters that tube tangentially, as shown in FIG. 2c, so that the water travels through the annular space 44 within tube 22 in the form of a cyclonic flow. During this passage of the water, the ultraviolet radiation from lamp 38 pass via the transparent quartz sleeve 40 through the water flowing through space 44, and is then reflected back by reflector 42 again through the water, before the water is outletted from the left end of tube 22 via outlet 8 and nozzle 16.

It will thus be seen that the water entering the sterilization tube 22 is not only free of undesirable odours and tastes, having been removed by the activated carbon 26 in tube 20, but is also free of solid particles, removed by the filter sleeve 32 in tube 20.

The removal of the solid particles from the water before entering the sterilization tube 22 increases the efficiency of the ultraviolet lamp 38 to sterilize the water. Moreover, any solid particles still remaining in the water would tend to be washed away by the cyclonic flow of the water through this tube. Further, the upward inclination of the sterilization tube 22, as well as of the filtration tube 20, prevents the formation of air bubbles within the filtration tube, which again could decrease the sterilization efficiency. The sterilization efficiency is still further increased by the provision of the annular reflector 42 which reflects back the radiation through the water flowing through annular chamber 44. Finally, should there be a failure in the ultraviolet lamp 38, or its energization circuit, the flow of the water will be automatically terminated by the solenoid-actuated valve 61.

While the invention has been described with respect to one preferred embodiment, it will be appreciated that many other variations, modifications and applications of the invention may be made.

What is claimed is:

1. A water-purifier device comprising:

a housing including means for mounting the housing vertically, a water inlet, and a water outlet;

a first tube connected at one end to said water inlet and extending within the housing, at an upward inclination from said one end, when the housing is mounted vertically; said first tube defining a first water flow passageway including a filter for removing solid particles and a quantity of activated carbon for removing undesirable odours and tastes from the water flowing through said first flow passageway;

and a second tube connected at its opposite ends between said first tube and said water outlet and extending within the housing over said first tube at an upward inclination from its end connected to said first tube, when the housing is mounted vertically; said second tube defining a second water flow passageway connected between said first tube and the housing outlet, and including an ultraviolet lamp subjecting the water flowing therethrough to ultraviolet radiation; a solenoid-actuated valve within the housing and upstream of said second tube; and means for closing said valve in response to a deenergization of said ultraviolet lamp.

2. The device according to claim 1, wherein said second tube includes an annular reflector surrounding the ultraviolet lamp and defining therewith an annular space consituting said second water flow passageway.

3. The device according to claim 2, wherein the connection to said second tube from the first tube includes a tangential inlet to said second water flow passageway to produce a cyclonic flow through said passageway.

4. The device according to claim 1, wherein said housing outlet includes a nozzle pivotally mounted about a vertical axis when the housing is mounted vertically.

5. The device according to claim 1, further including an electrical circuit for energizing said ultraviolet lamp, and a control circuit for controlling said solenoid-actuated valve to open it to the flow of water to said first tube; said electrical circuit including a DC supply, an oscillator producing a high frequency output applied to the ultraviolet lamp, a rectifier for converting the high frequency output to direct current applied to said control circuit, and a resistor sensing the flow of current to the ultraviolet lamp, said control circuit including a transistor controlled by said resistor for controlling the power to the solenoid-actuated valve to close it automatically in response to the deenergization of said ultraviolet lamp as indicated by the termination of current flow through said resistor.

* * * * *